United States Patent [19]

Hardouin et al.

[11] 3,960,952
[45] June 1, 1976

[54] ANHYDROUS BASES AND SALTS OF DYESTUFFS OF THE AURAMINE SERIES, PROCESS FOR THEIR PREPARATION AND THEIR USE

[75] Inventors: Jean-Claude Henri Raoul Hardouin, Chantilly; Maurice Rene Jean Vallette, Precy-sur-Oise, both of France

[73] Assignee: Produits Chimiques Ugine Kuhlmann, Paris, France

[22] Filed: Aug. 6, 1974

[21] Appl. No.: 495,719

[30] Foreign Application Priority Data
Aug. 10, 1973 France .............................. 73.29331

[52] U.S. Cl. ............................................ 260/566 R
[51] Int. Cl.² ...................................... C07C 119/00
[58] Field of Search ................................ 260/566 R

[56] References Cited
UNITED STATES PATENTS
3,209,027   9/1965   Groshtos ........................ 260/566 R Primary Examiner—Gerald A. Schwartz
Attorney, Agent, or Firm—Beveridge, Degrandi, Kline & Lunsford

[57] ABSTRACT

Process for the preparation of an anhydrous base or salt of a dyestuff of the Auramine series, which comprises isolating the base or salt in acetone, methylethylketone or diethylketone; products prepared by such a process; the hydrofluoride of the base of Auramine O; the phosphate of the base of Auramine O; the hydrobromide of the base of ethylauramine; the phosphate of the base of ethylauramine; the hydrofluoride and phosphate of the base of Auramine G and paper, inks, textile fibers, leather or plastics materials colored by the hydrofluoride of the base of Auramine O; the phosphate of the base of Auramine O; the hydrobromide of the base of ethylauramine; the phosphate of the base of ethylauramine.

13 Claims, No Drawings

ANHYDROUS BASES AND SALTS OF DYESTUFFS OF THE AURAMINE SERIES, PROCESS FOR THEIR PREPARATION AND THEIR USE

The invention relates to the anhydrous bases and salts of dyestuffs of the Auramine series, to a new process for their preparation and to their use.

It is known to prepare an anhydrous base of a dyestuff of the Auramine series by neutralising a salt, for example a hydrochloride, in an aqueous medium.

It is also known to prepare various anhydrous salts of the above dyestuffs in an aqueous medium by salting out by means of the sodium salt corresponding to the anion of the dyestuff or by displacing the chloride of the Auramine with the aid of an anion resulting in a salt which is less soluble than the chloride, as can be seen in French Pat. Nos. 1,190,365 and 1,582,391.

The preparation of certain salts of the above dyestuffs may also be effected in an alcoholic medium according to French Pat. No. 1,256,464 or in a solvent of the benzene series.

These known processes generally lead to bases or salts of a dyestuff of the Auramine series in amorphous form often containing disadvantageous proportions of mineral impurities and/or organic impurities and frequently presenting problems regarding filtration and washing. If hydrophobic solvents are used, these are often difficult to eliminate from the final product. During the preparation or manipulation of the dry products, undesirable emissions of dust having a strong colouring power are usually observed.

An object of the present invention is to remove or at least minimise the above-described disadvantages of the prior art.

According to the present invention a process is provided for preparing the anhydrous bases and salts corresponding to the bases of dyestuffs of the Auramine series, which comprises isolating these products in acetone, methylethylketone or diethylketone.

Examples of bases of dyestuffs of the Auramine series are the base of Auramine O (Colour Index 1971 edition No. 41 000 : 1), the base of Auramine G (Colour Index 1971 edition No. 41 005), the base of ethylauramine (Colour Index 1971 No. 41 001) and the base of the Auramine obtained from N-ethyl ortho toluidine [bis (4,4'-diethylamino)-3,3'-dimethyl-diphenyl-methylene-imine].

In accordance with the invention, an anhydrous salt of the base of a dyestuff of the Auramine series may be isolated by putting the base and acid corresponding to this salt in contact under agitation with acetone, methylethylketone or diethylketone, followed by separation, washing and drying. The separation may be effected for example by any physical process which enables the products to separate, such as decantation or preferably filtration. The filtration is preferably preceded by cooling the liquor to be filtered to a temperature lower than 20°C., for example to a temperature of from 0° to 5°C.

The salt is preferably washed with ketone of the same chemical nature as that which has been used as the reaction medium.

Salts which may be prepared according to the process of this invention are for example the hydrochlorides, sulphates, nitrates, nitrites, sulphonates, benzoates, nitro benzoates and more particularly hydrobromides, hydrofluorides, phosphates, formates, acetates, propionates, lactates, monochloroacetates, dichloroacetates, bromoacetates or cyanoacetates of a dyestuff of the Auramine series.

In accordance with the invention a base of a dyestuff of the Auramine series may be isolated by neutralising under agitation a salt of the base in a mixture of acetone, methylethylketone or diethylketone and water, followed by separation, washing and drying, the proportion by weight of water in the mixture of ketone and water used during neutralization not exceeding 40% and preferably being from 15% to 25%.

The base may be washed with a mixture of ketone and water in which the proportion by weight of water does not exceed 75% and is preferably from 40% and 60%.

Washing is generally continued until a sample of the filtrate contains practically no more mineral ions.

Drying may be effected at a temperature of at least 20°C. below the melting point and may be carried out at reduced pressure.

The starting substances, particularly the acids used in the process of the invention, are preferably anhydrous, especially for the preparation of the anhydrous salts. Acids such as phosphoric acid may be used in the form of polyphosphoric acid, i.e. phosphoric acid containing phosphoric anhydride in solution.

During the preparation of the salts of the dyestuffs of the Auramine series, it is possible to use the base in the form of its solution in a hydrophobic solvent (II) having a boiling point lower than 150°C. and to separate the layer containing this solvent (II) after the base has been extracted therefrom.

The new process enables both the bases and the salts of the bases of the dyestuffs of the Auramine series to be obtained simply and industrially in a form which is generally crystalline, easy to filter, wash and dry, and extremely pure.

Their crystalline structure gives them the property of not emitting dust of a high colouring power when being manipulated and this property is greatly valued with dyestuffs of this series.

The purity reaches and often exceeds 98% by weight, and neither the bases nor the salts contain practically any Mischler ketone or any mineral salts.

The yields are improved and, in particular, the yields of Auramine salts can reach and exceed 90% of the theoretical yield.

The invention includes the products prepared according to the new process.

The melting points of some Auramine O salts prepared according to the new process are as follows: formate 146°C., lactata 146° to 148°C., monochloroacetate 246° to 250°C., dichloroacetate 190° to 192°C., acetate 98° to 100°C., bromoacetate 145° to 150°C., cyanoacetate 136° to 140°C., and propionate 90° to 92°C.

The hydrobromide of the base of Auramine O prepared according to the new process has a melting point of the order of 250°C. with decomposition.

The invention also includes the following new products: the hydrofluoride of the base of Auramine O having a melting point of $175° \pm 2°C.$ (with decomposition), the phosphate of the base of Auramine O having a melting point of $145° \pm 5°C.$ (with slight decomposition), the hydrobromide of the base of ethylauramine having a melting point of 255° to 260°C., the phosphate of the base of ethylauramine having a melting point of $120° \pm 5°C$, and the hydrofluoride and phosphate of the base of Auramine G.

The invention also includes the application of the products prepared by the new process and the new products to the colouration of paper, inks for flexography, printing inks, textile fibres, leather, plastics materials, microbiological preparations or foodstuffs.

The invention is illustrated by the following non limitative Examples wherein parts and percentages are understood by weight:

EXAMPLE 1

391 parts of the base of Auramine O are put in suspension with stirring in 1,200 parts of acetone. 48 parts of 60% hydrofluoric acid are added to this suspension. The temperature rises from 21° to 35°C. The mixture is left to return to atmospheric temperature, cooled to 10°C. for 1 hour, filtered, then washed with 1,200 parts of acetone and dried at 110°C.

290 parts of the hydrofluoride of auramine O are thus obtained. This salt which is thus obtained has solubilities of from 35% to 50% in alcohols, ethylene glycol and its homologues.

EXAMPLE 2

321.5 parts of Auramine O are put in suspension with stirring in 680 parts of acetone and 140 parts of water. 340 parts by weight of 30% soda are added to this suspension. The temperature rises from 20/22° to 35°C. Then, a transition to solution is observed, followed by precipitation of the base of Auramine in crystalline form. The mixture is left to return to atmospheric temperature, cooled to 0°–5°C. for 4 hours and filtered. The filtered material is washed twice with 400 parts by weight of 50% acetone-water mixture and then dried at 70°–80°C. for 24 hours. 212 parts of the base of Auramine O are thus obtained, with a melting point of 135°–136°C. (theory: 135°C.).

EXAMPLE 3

267 parts of the base of Auramine O are put in suspension in 1600 parts of acetone. Then, stirring very briskly, 98 parts of 100% phosphoric acid are added and the Auramine phosphate is precipitated very rapidly. The mixture continues to be stirred for 15 minutes and is then filtered. The filtered material is washed three times with 80 parts of acetone and dried under vacuum for 8 hours at 50°C. 285 parts of Auramine O phosphate are thus obtained.

EXAMPLE 4

26.7 parts of the base of Auramine O are put in suspension in 160 parts of acetone. Then, stirring very briskly, 11 parts of 104% polyphosphoric acid in $H_3PO_4$ are added and the Auramine phosphate is precipitated very rapidly. The mixture is stirred for 15 minutes and filtered. The filtered material is washed with 160 parts of acetone and dried under reduced pressure at 50°C for 8 hours. 27.6 parts of Auramine phosphate are thus obtained.

EXAMPLE 5

200 parts of Auramine hydrochloride, obtained by starting with diethylaniline, are put in suspension in 1,300 parts of xylene and 2000 parts of water. The temperature is raised to 60°C. and 290 parts of 30% soda are added.

The Auramine base, which is thus obtained in solution in the Xylene, decanted at 60°C, washed in water then dehydrated under pressure. Then 2600 parts of acetone and 54 parts of 100% phosphoric acid are introduced. The Auramine phosphate is decanted, washed with acetone then dried under reduced pressure at 50°C. for 24 hours. 175 parts of phosphate are obtained which after being powdered is in the form of an orange powder.

We claim:

1. Process for the preparation of an anhydrous base or salt of a dyestuff of the Auramine series, which comprises isolating the base or salt in acetone, methylethylketone or diethylketone, the salt being a hydrobromide, hydrofluoride, phosphate, formate, acetate, propionate, lactate, monochloroacetate, dichloroacetate, bromoacetate or cyanoacetate.

2. Process as claimed in claim 1 which comprises isolating an anhydrous salt of a base of a dyestuff of the Auramine series by putting the base and the acid corresponding to this salt in contact under agitation with acetone methylethylketone or diethylketone, followed by separation, washing and drying.

3. Process as claimed in claim 2 in which the separation is effected by filtration.

4. Process as claimed in claim 3 in which the filtration is preceded by cooling the liquor to be filtered to a temperature lower than 20°C.

5. Process as claimed in claim 4 in which the liquor is cooled to a temperature of from 0° to 5°C.

6. Process as claimed in claim 2 in which the washing is effected with a ketone of the same chemical nature as that used as the reaction medium.

7. Process as claimed in claim 1 in which the salt is a hydrobromide, hydrofluoride, phosphate, formate, acetate, pripionate, lactate, monochloroacetate, dichloroacetate, bromoacetate or cyanoacetate of a dyestuff of the Auramine series.

8. Process as claimed in claim 1 which comprises isolating a base of a dyestuff of the Auramine series by neutralising under agitation, a salt of the base in a mixture of acetone, methylethylketone or diethylketone and water, followed by separation, washing and drying, the proportion by weight of water in the mixture of ketone and water used during neutralization not exceeding 40%

9. Process as claimed in claim 8 in which the mixture of ketone and water contains from 15% to 25% by weight of water.

10. Process as claimed in claim 8 in which the washing is effected with a ketone and water mixture in which the proportion by weight of water does not exceed 75%.

11. Process as claimed in claim 10 in which the proportion by weight of water is from 40% to 60%.

12. Process as claimed in claim 8 in which the drying is effected at a temperature of at least 20°C. below the melting point of the base.

13. Process as claimed in claim 1 in which the starting materials are anhydrous.

* * * * *